United States Patent [19]

Clark

[11] Patent Number: 5,982,897

[45] Date of Patent: Nov. 9, 1999

[54] SELECTIVE DENIAL OF ENCRYPTED HIGH PRECISION DATA BY INDIRECT KEYING

[75] Inventor: James Monroe Clark, Verona, N.J.

[73] Assignee: ITT Corporation, New York, N.Y.

[21] Appl. No.: 09/095,623

[22] Filed: Jun. 10, 1998

Related U.S. Application Data

[63] Continuation of application No. 09/429,519, Apr. 26, 1995, abandoned.

[51] Int. Cl.⁶ .............................. H04L 9/00; H04B 7/185; G01S 5/02; H04K 1/02
[52] U.S. Cl. ................................. 380/21; 380/9; 342/354; 342/357
[58] Field of Search .......................... 380/21, 9; 342/357, 342/354

[56] References Cited

U.S. PATENT DOCUMENTS

| | | | |
|---|---|---|---|
| 5,444,449 | 8/1995 | Poskett et al. | 342/354 |
| 5,640,452 | 6/1997 | Murphy | 380/5 |

Primary Examiner—Gail O. Hayes
Assistant Examiner—Hrayr A. Sayadian
Attorney, Agent, or Firm—Arthur L. Plevy

[57] ABSTRACT

High precision transmitted navigational data as encrypted data transmitted by global positioning (GPS) satellites is made unavailable in regions designated as hostile and during desired intervals, while allowing the data to be available outside the hostile region. All satellites in the GPS constellation transmit the high precision navigational data in encrypted form. However, only the satellites that are not visible to the hostile region transmit the periodic key necessary to decrypt the data. The periodic key changes after a predetermined time interval. During a given time interval the same key value is used by all satellites for encryption of the high precision navigational data. A receiver can obtain the current periodic key from any visible satellite which is transmitting the periodic key. This key is then used to decrypt the high precision navigational data from that satellite and all other visible satellites. As a result, users in the hostile region are denied access to the high precision navigational data because they are unable to obtain the periodic key necessary to decrypt the data.

24 Claims, 3 Drawing Sheets

SELECTIVE DENIAL OF ENCRYPTED HIGH PRECISION DATA BY INDIRECT KEYING

This application is a continuation of Ser. No. 08/429,519 filed Apr. 26, 1995, now abandoned.

FIELD OF THE INVENTION

The present invention relates to navigation systems and, more particularly, to selective access and denial of the reception of encrypted high precision navigational data. The encrypted data is the type of data transmitted by the Global Positioning Satellite (GPS) transmitter.

BACKGROUND OF THE INVENTION

The Global Positioning System (GPS) is an accurate, three-dimensional navigation system. GPS consists of a constellation of twenty one satellites and three spares that orbit the earth twice a day at an altitude of 10,898 miles, transmitting precise timing information. A network of ground stations and passive user receivers respond to the information. Each satellite continuously broadcasts pseudo-random codes at L-band frequencies, L1 at 1575.42 MHz and L2 at 1227.6 MHz. L1 is modulated with two types of code, the coarse/acquisition code (CA-code) and precision code (P-code). L2 carries an encrypted P-code. The network of ground stations are at precisely known locations. Transmissions are received from the satellites, analyzed and GPS time is compared with universal standard time at the ground stations. Corrections are transmitted to the satellites from the ground station. To determine a location (latitude, longitude and altitude) a user requires the simultaneous signals from four or more satellites orbiting the earth. Simultaneous signals from at least three satellites can be used to provide two dimensional positioning (latitude and longitude). The signals are analyzed and interpreted by the GPS receiver to determine the location. The interval between the transmission and the reception of the satellite signal is used to calculate the unit's distance from each of the satellites being used. Those distances are used in algorithms to compute a position.

A potential disadvantage of the world wide availability of the GPS satellites is the possibility that terrorists and hostile nations could use the navigational facilities to accurately aim weapons and to damage sensitive target areas from great distances.

Limiting the available accuracy of the GPS data reduces this threat and permits a wide variety of peaceful uses. Selective Availability (SA) is a method that reduces the accuracy for civilian and unauthorized users. SA inserts random errors into the system and reduces the CA-code accuracy. However, this prevents access by peaceful users to high precision navigational data. High precision navigational data is necessary for many applications, including the landing of commercial aircraft. The GPS system is well known and specified. See "The Journal of Navigation", volume 25 summer 1978, where the GPS system is described in detail.

Accordingly, there is a need to have high precision navigational data available for peaceful use while limiting access for hostile use.

Hostile users can steal, buy GPS receivers or build alternative receivers but lack the resources to create an entire equivalent or alternative navigational system. It is necessary to identify regions of the world, which may vary over time, where hostile actions are likely to occur.

High precision navigational data such as the encrypted GPS data, will be referred to as controlled access data.

Trusted users that require access to high precision navigational data are provided with a plurality of receivers containing decryption means. This makes high precision positioning available to users that need it while preventing hostile users from having access. However the decryption means must be kept secured from hostile users. The level of security depends directly on the reliability of procedures and other safeguards for preventing the theft of the decryption means. The greater the number of mobile receivers equipped with decryption means the greater the likelihood that security will be breached. Thus a hostile user can obtain access to the high precision navigational data.

A hidden denial channel is another tactic to control access to high precision navigational data. It utilizes an encryption method that prevents a denial channel from being separated from the high precision navigational data. This encryption method prevents the denied data from being blocked without also blocking access to the encrypted high precision navigational data. The hidden denial channel can disable selected user sets. The denied users would be unable to defeat disablement indicative of denying access to the high precision navigational data. However, the hostile user can utilize a stolen decryption means to by-pass the restriction.

Another tactic for restricting user access to the high precision navigational data in hostile regions is to include data that identifies hostile regions in the encrypted portion of the signals. The receivers that have high precision navigational data decryption means would also include a function to inhibit access to the higher accuracy when the receiver is located within a hostile region. This will only protect the unaltered receiver. Unless the decryption means is made inseparable from the position calculation means, the security will not be effective. The hostile user can purchase or build an alternative GPS receiver. This receiver when coupled to the stolen decryption means can circumvent the inhibit function.

Thus, it is desirable to implement a system where stolen receivers with high precision navigational data decryption means are denied high precision access when located in hostile regions.

While a hostile region might also be denied access to the high precision navigational data by jamming methods, it is not obvious how this could be done without also denying access to friendly military users.

Another method uses a complex secret sharing algorithm which requires the reception of multiple keys from corresponding GPS satellites in order to gain access to the high precision navigational data Access to the high precision navigational data is denied within a denial region by not transmitting the corresponding key from the corresponding satellites that are visible within the denial region.

It is, therefore, an object of the present invention to provide an improved system to enable navigational receivers with selective access and denial based upon receiver location with respect to the reception of high precision navigational data.

SUMMARY OF THE INVENTION

The present invention provides navigation systems such as GPS with selective access and denial to the reception of encrypted high precision navigational data.

A denial region is selected which may include a hostile region or other region. Boundaries of the denial region are defined by the visibility of the corresponding transmitters. Access is denied to the encrypted high precision data when a receiver is located within a denial region. Access is permitted when a receiver is located outside the denial region. As will be explained it is the denial to the receiver of access to a periodic key which must be employed to encrypt the high precision data. The suppression of the transmission of this key prevents a receiver from decrypting the data.

The encrypted data and other data is transmitted from all the corresponding distributed transmitters. Only the transmitters that are not visible within the denial region transmit the periodic key.

A receiver obtains the high precision navigational data from at least three transmitters in order to determine location. The data received from the transmitters is encrypted. Whenever the receiver is not located within a denial or hostile region, the periodic key is received from at least one of the transmitters. The received encrypted data is decrypted using the periodic key. When the receiver is located within a denial region, the periodic key is not available from any of the visible transmitters. The lack of access to the periodic key by the receiver denies access to the high precision navigational data.

BRIEF DESCRIPTION OF THE FIGURES

The above objects and further features and advantages of the invention are described in detail below in conjunction with the drawing, of which.

DETAILED DESCRIPTION OF THE INVENTION

Figure 1:
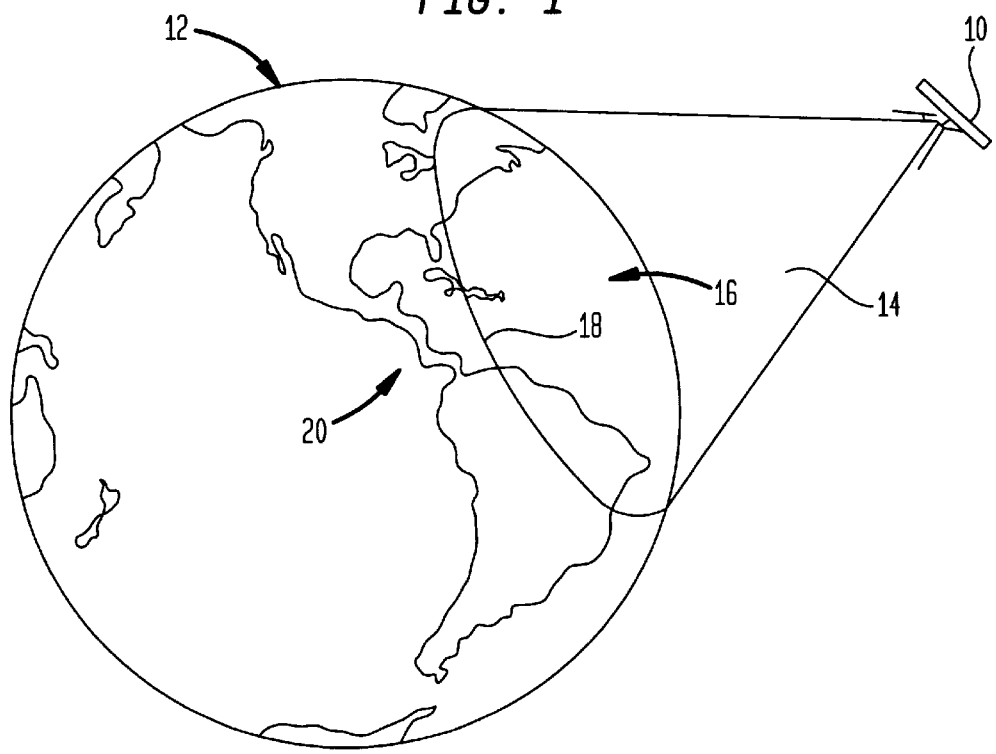
FIG. 1 shows a detail of a single satellite's area of coverage.

Although the present invention, selective denial by indirect keying, is especially suited for use with GPS, the methods and apparatus disclosed here can be applied to other navigation systems using distributed transmitters, whether such transmitters are moving or stationary, land or space based or other types of secure data transmission systems.

The present invention, selective denial by indirect keying, generally allows the encrypted data to be unavailable in hostile regions, while allowing decryption outside the hostile region.

The system of selective denial by indirect keying operates in two modes: a peaceful mode and a hostile mode or a first data access mode and a second data denial mode. In the peaceful mode there is no hostile region and therefore there is total access. All satellites in the GPS constellation of satellites transmit high precision navigational data in encrypted form and transmit an encryption key necessary to decrypt the data. All receivers are able to access the high precision navigational data in this mode. In the hostile mode there is at least one designated hostile region where it is necessary to deny access to the high precision navigational data. All satellites in the GPS constellation continue to transmit high precision navigational data in encrypted form. However, only satellites that are not visible to the hostile region transmit the periodic key necessary to decrypt the data.

The periodic key changes after a predetermined time interval. During a given time interval the same key value is used by all satellites for encryption of the high precision navigational data. The time interval for changing the key can be every half-hour or another selected time interval. A receiver can obtain the current periodic key from any visible satellite which is transmitting the periodic key. This key is then used to decrypt the high precision navigational data from that satellite and all other visible satellites. This is called selective denial by indirect keying because the key can be obtained from one satellite and used to decrypt data from another satellite.

The periodic key is transmitted for more than one key period in order to allow time for the receivers to reliably acquire it before being used. The periodic key may be sent several times during each time interval to minimize the start up delay when a user turns on the receiver. The user will only have to wait for the time for a retransmission of the periodic key and not an entire time interval. Further, If the received periodic key is garbled, there are many opportunities to try again, from the same or another satellite, during each time interval.

When a hostile region is identified this identification data is transmitted to all satellites in the GPS constellation of satellites. The transmission is implemented by the ground stations. The satellites that are visible within the hostile region suppress transmission of the periodic key. All satellites, however, continue to send the encrypted high precision navigational data. As a result, users in the hostile region are denied access to the high precision navigational data because they are unable to receive the periodic key necessary to decrypt the data. The promptness of this denial depends on the time needed to send the location of the hostile region to the satellites and the time required for the current periodic key to expire.

The present invention makes use of the overlapping areas of visibility provided by individual satellites of the GPS constellation of satellites. FIG. 1, illustrates a satellite 10 in orbit above the earth 12. The satellite 10 transmits a directional signal 14 towards the earth 12. The directional signal 14 can only be received in an access region 16. The area 20 outside of the access region 16 cannot receive the directional signal 14. The edge or periphery of the access region 16 defines an arc shaped boundary 18. The exact shape and size of the access region 16 is dependent upon the position, orientation, and transmitter antenna configuration of the satellite 10. There factors are well known.

Figure 2:
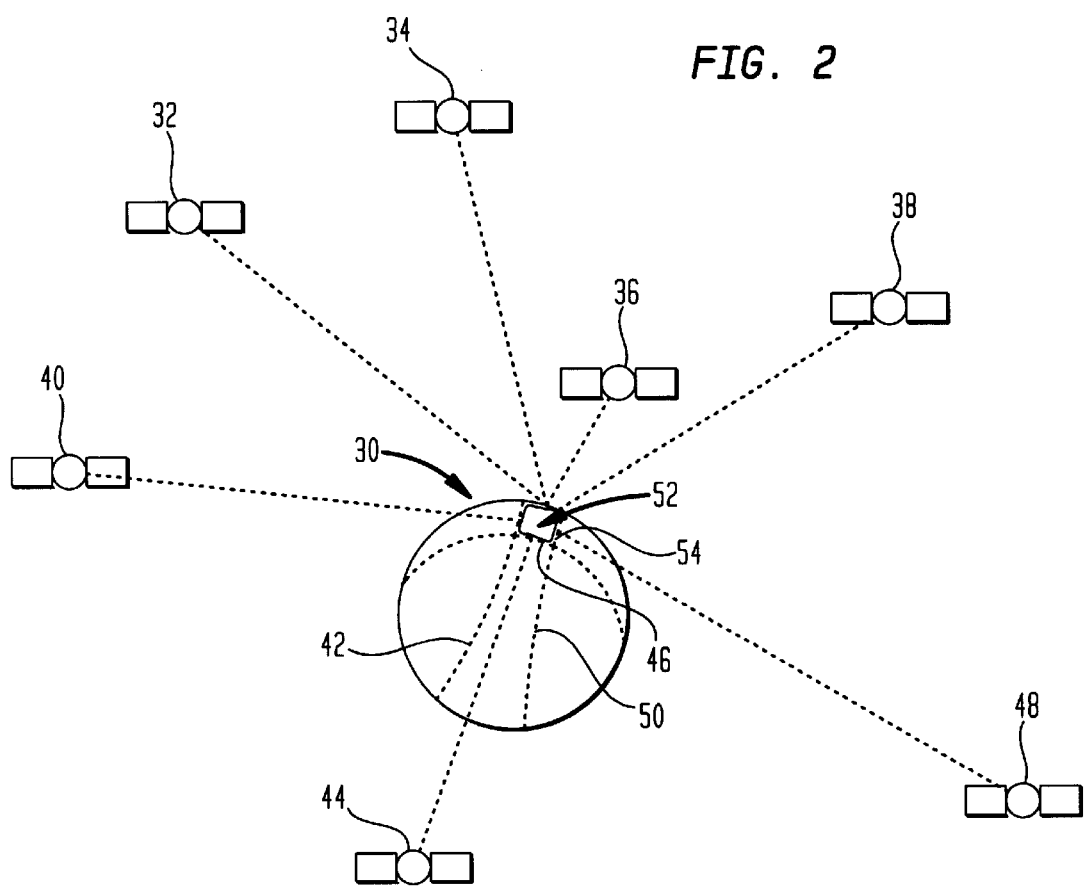
FIG. 2 shows a partial GPS satellite network and a denial region.

Referring to FIG. 2, there is shown seven satellites 32, 34, 36, 38, 40, 44, and 48 which are part of a the GPS satellite constellation. The satellites are shown in orbit above the earth 30. Access to high precision navigational data is to be denied is hostile region 52. Four satellites 32, 34, 36, and 38 are visible within the hostile region 52 and transmit encrypted high precision navigational data but do not transmit the periodic key necessary for decryption. Three satellites 40, 44, and 48 which have access regions that are close to, but not visible to the hostile region 52 transmit encrypted high precision navigational data and the periodic key necessary for decryption. The boundaries of visibility of the three satellites 40, 44, and 48 are shown as arcs 42, 46, and 50 which lie outside the hostile region 52. Users within an access region of one of the three satellites is 40, 44, and 48 have access to the periodic key which is then utilized to decrypt the encrypted high precision navigational data from any of the satellites in the GPS constellation of satellites. Users within the hostile region 52 do not have access to the periodic key and therefore are denied access to the key and cannot decrypt the high precision navigational data.

Users near the hostile region 52 have access to the periodic key from any of the satellites 40, 44, and 48. These users have access to the same number of satellites as before, because all satellites continue to send the encrypted high precision navigational data. Sometimes users near the hostile region 52 are denied access to the key because all of the currently visible satellites are also visible to the hostile region. This occurs because the constellation of GPS satellites are continually moving, and as a result, the region of denial changes shape and size continuously and sometimes suddenly. The region of denial always includes the hostile region 52, but as the boundaries of satellite visibility change, the denied region changes.

Although the degraded service to neighbors of the hostile region 52 is undesirable, it is not surprising to find that there are undesirable consequences of being close to the hostile region 52.

The extent of the intermittent access to high precision navigational data in the area outside the hostile region 52 near the edge of the denial region 54 is reduced when the time between changing of the periodic key is reduced or when the periodic key is made available prior to its use. This is because only one good copy of the periodic key is needed to gain access to the high precision navigational data. However, to be denied access, a user receiver which is near the hostile region 52 must be in the moving portion of the denial region 54 for a period of time after a new periodic key becomes available.

The impact of intermittent access in the moving portion of the denial region depends on the user's needs. Some users need continuous position readings, while others may be able to wait during a temporary period of reduced accuracy. Still other users may not need the highest accuracy.

Other methods can be combined with the basic method to minimize the degradation of navigation services caused by intermittent access to users near the hostile region 52.

One method is to utilize local ground based transmitters set up on the periphery of a hostile region 52 broadcasting signals outward to provide the non-hostile users with an alternate source of the periodic key. Some of the proposed systems for augmenting GPS to provide additional accuracy utilize ground based transmitters broadcasting signals compatible with those broadcast by the satellites. The present invention can be applied to the ground based transmitters equally as well as to the satellites.

Another method is to modify the downlink antennae systems of the satellites to provide control of the coverage of the broadcast signals. If the radio beam was shifted to one side, some locations on earth would be able to receive the signal while other locations would not. This method of control is especially useful when the satellite positions are such that a large region near the hostile region 52 would be otherwise denied. However, a beam-steering method would deny access to even the privileged users, unless additional signals, at additional expense, are provided for the privileged users. Such beam-steering and beam-shaping techniques are known.

The constellation of GPS satellites transmits a periodically changing key. It is not practical to supply the constellation of GPS satellites with a list of desired key values, because of the additional memory and transmission costs. Instead, each satellite is provided with means to produce the values of the changing key from a master key that is changed much less frequently. This task is exactly the sort of thing that cryptographic systems do best. Many cryptographic systems are suitable and well known to those skilled in the art. U.S. Pat. No. 4,658,094, entitled Encryption Apparatus and Method for Raising a Large Unsigned Integer to a Large Unsigned Integer Power Modulo a Large Unsigned Integer, issued to James M. Clark on Apr. 14, 1987 the inventor herein. This patent discloses information relating to public key cryptography systems. U.S. Pat. No. 5,289,397, entitled High-Speed Modulo Exponentiator Device, issued to James M. Clark et al. on Feb. 22, 1994 discloses a high-speed integrated circuit used in certain classes of encryption systems. Both patents are assigned to ITT Corporation the assignee herein. As is well known, cryptography is the science of transforming messages for the purpose of making the message unintelligible to all but the intended receiver. Essentially, encryption is a special form of computation and such systems depend upon the difficulty of computation for their security. An article entitled "The Mathematics Of Public Key Cryptography" by Martin E. Hellman and published in SCIENTIFIC AMERICAN, August 1979, Vol. 241 #2, pages 146 to 157, provides a detailed history of the development of cryptography and the problems inherent in such systems. Many encryption techniques have been extensively employed in the prior art. It is unnecessary to choose a particular cryptographic process and describe it here, except to specify that the cryptographic process must be deterministic. With a deterministic cryptographic process, all satellites in the GPS constellation, when they are given the same cryptographic design, the same master key, the same scheduling rules, and have closely synchronized clocks, must independently produce the same sequence of values for a periodic key.

The present invention can also accommodate other kinds of users, including non-hostile users within the hostile region 52, with different types of receivers, having greater and lesser privileges.

If a class of privileged users are provided with the same master key, cryptographic design, and scheduling rules as the satellites in the GPS constellation are provided with, then by using GPS receivers in a low-accuracy mode, the privileged user can easily acquire the clock timing from the satellites with accuracy sufficient to generate the periodic key. Privileged users do not have to depend on the satellites as a source for the periodic key, and thus can access the high precision navigational data as desired and even within a denial region 54. Privileged users would have to be qualified to carefully safeguard their receivers.

By encrypting the periodic key, with a registration key having a much longer period of use, a class of less-privileged user can be established. The registration key is distributed only to registered users that have a valid need for high accuracy navigational data and no known motives for hostile use. With the registration key, the less-privileged are able to decrypt and use the periodic key to access the high precision navigational data, while other users lacking the registration key are denied access.

When no hostile region 52 has been identified, the system can be operated in a peaceful mode that provides full accuracy to all users. Alternatively, full accuracy might be made available to those recognized to have a peaceful commercial need for it, but who are not necessarily qualified to guard their means of access.

To implement a peaceful mode the periodic key is transmitted along with the encrypted high precision navigational data from all satellites. When used in conjunction with the registration key this allows for fee based or commercial control of access to the high precision navigational data.

An alternative way to implement the peaceful mode is to transmit the high precision navigational data without encryption, and to include data indicating that decryption is not needed.

Figure 3:
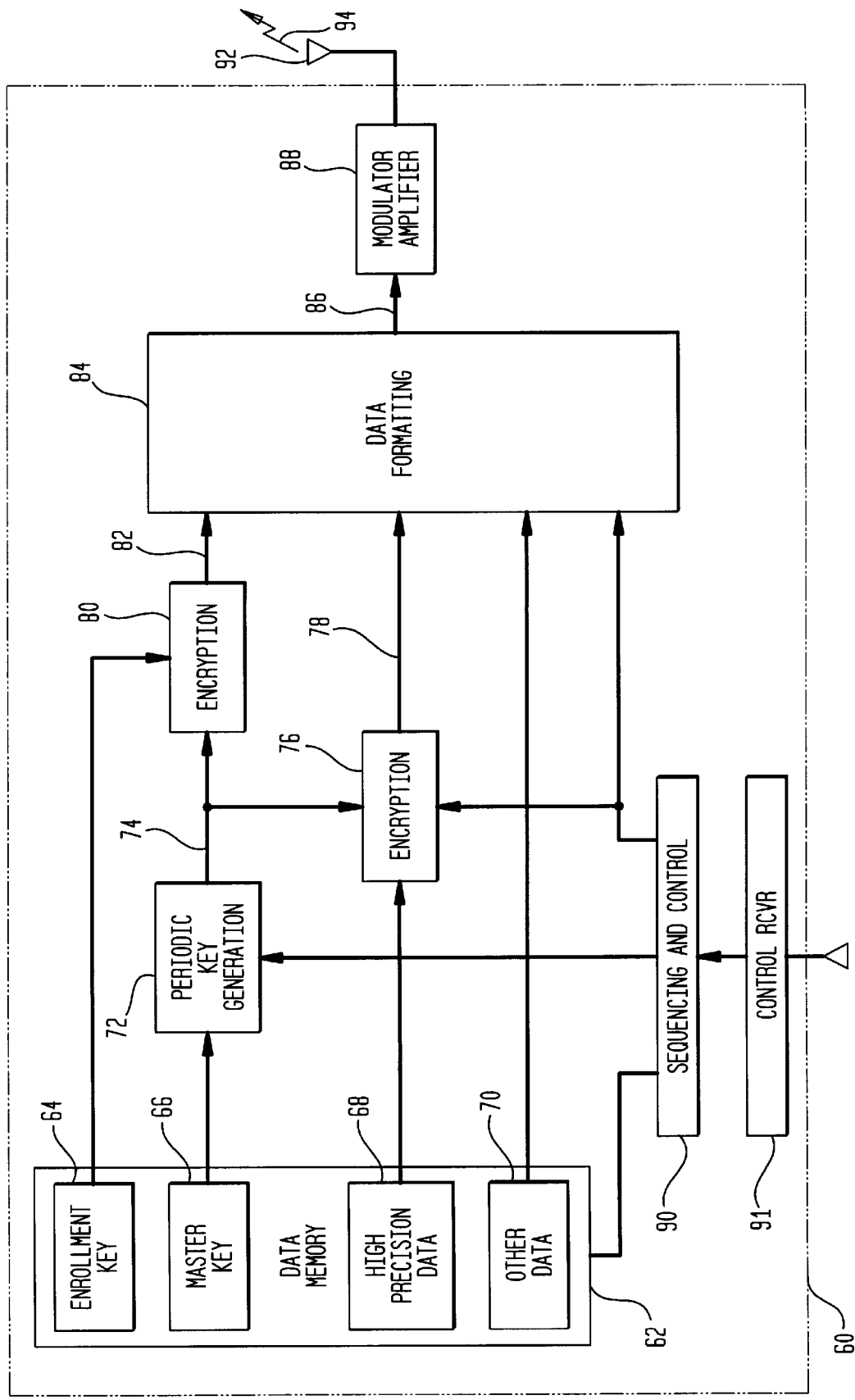
FIG. 3 shows a GPS satellite transmitter with selective denial by indirect keying.

Referring to FIG. 3 a block diagram of an embodiment of the present invention as it is implemented within a GPS satellite transmitter 60 is illustrated. The GPS satellite transmitter 60 contains a data memory 62. The data memory 62 stores an enrollment key 64, a master key 66, high precision navigational data 68, and other data 70. A periodic key generation function 72 uses the master key 66 along with other suitable data, such as a time code, to generate a periodic key 74 which changes over time. A first encryption function or generator 76 uses the periodic key 74 or the key value, that has been generated and transmitted during a previous time interval, to encrypt the high precision navigational data 68. A second encryption function 80 uses the enrollment key 64 to encrypt the periodic key 64. When a GPS satellite transmitter 60 is not visible within the denial region 54, a data formatting function 84 arranges the encrypted periodic key 82, the encrypted high precision navigational data 78, and the other data 70 into a data message 86. When a GPS satellite transmitter 60 is visible within the denial region 54, a data formatting function 84 arranges the encrypted high precision navigational data 78 and the other data 70 without the encrypted periodic key 82 into a data message 86. A status code, which is included in the other data 70, indicates whether the high precision navigational data 68 is encrypted, and whether the encrypted periodic key 82 is included in the data message 86. A modulator amplifier 88 is responsive to the data message 86 and produces an output signal 94. The output signal is transmitted from an antenna 92.

A sequencing and control function 90 enables the encryption system, computes the visibility of the GPS satellite transmitter 60 within the hostile region 52 and schedules changes of the periodic key 74.

The functions that are shown in FIG. 3 can be constructed using designs that are well known to those ordinarily skilled in the art. The satellite includes a receiver 11 for responding to data from a ground station. The ground station transmits control data to the satellite to inform of the passage of the satellite into a hostile region or to suppress encryption key transmission. Thus upon receipt of this data the encryption key is suppressed and not transmitted. The satellite data memory 62 alternatively includes a RAM section which is updated with information or data is processed to determine position and therefore suppress the transmission of the encryption key accordingly. Suppression of the key can be implemented in any mode, such as time of day suppression, geographical suppression, and combination of both and so on.

Figure 4:
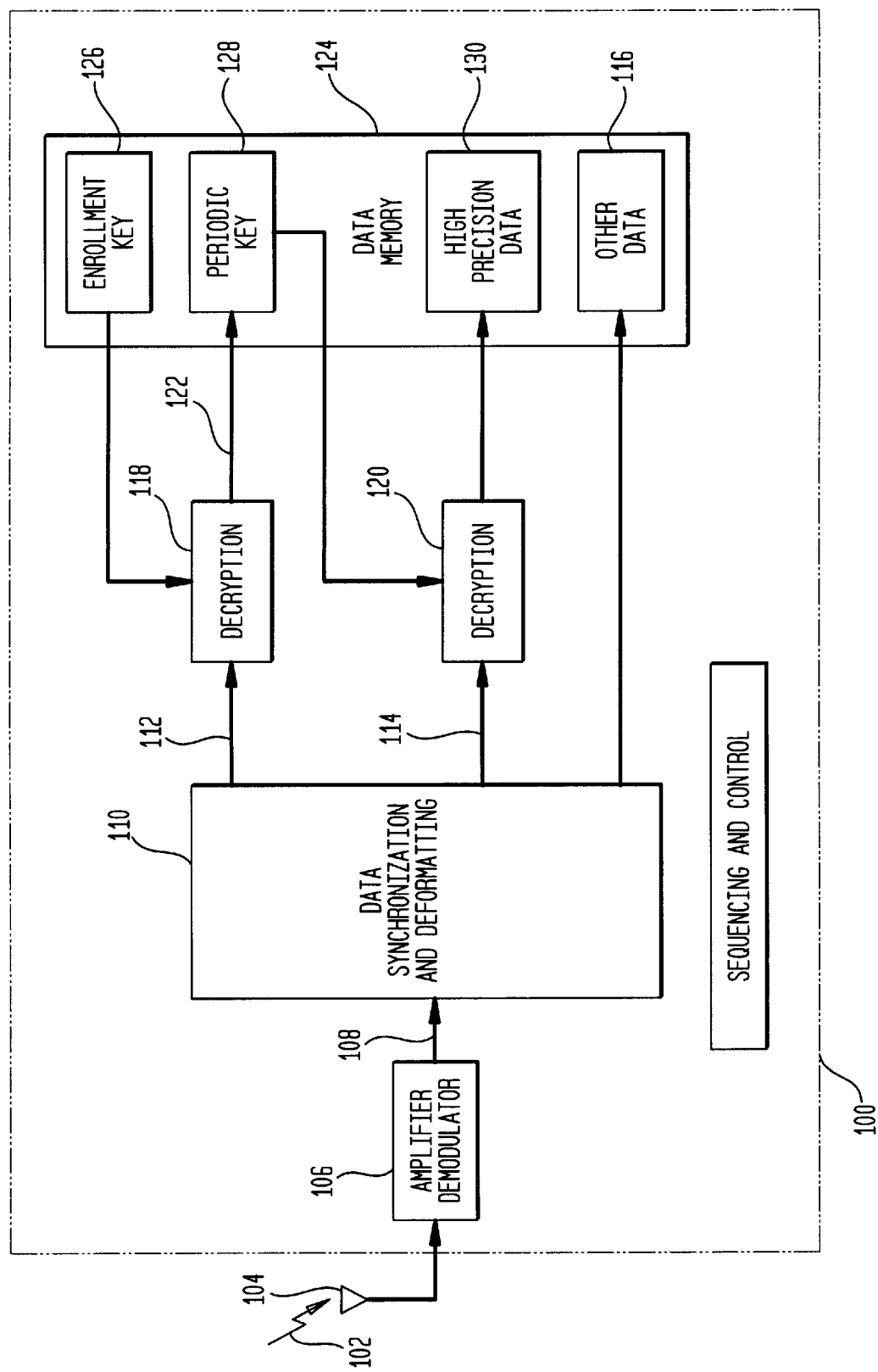
FIG. 4 shows a GPS receiver with selective denial by indirect keying.

Referring to FIG. 4 a block diagram of the preferred embodiment of the present invention as implemented within a user's GPS receiver 100 is illustrated. A receiver must obtain the high precision navigational data from at least three GPS transmitters in order to determine their location The data received from the GPS transmitters is encrypted.

The GPS receiver 100 accesses a transmitted signal 102 through an antenna 104. An amplifier demodulator 106 processes the transmitted signal 102 to produce a formatted data message 108.

When the GPS receiver 100 is not within the denial area 54, the formatted data message 108 is rearranged by a data synchronization and deformatting function 110 to recover the encrypted periodic key 112, encrypted high precision navigational data 114 and other data 116. The enrollment key 126, which has been previously supplied to all authorized users and was loaded into the data memory 124 of the GPS receiver 100, is used by a first decryption function 118 to decrypt a periodic key 122. The periodic key 122 is then stored in the data memory 124. A second decryption function 120 uses the stored periodic key 128 to decrypt the high precision navigational data 130. The high precision navigational data 130 is then stored in the data memory 124.

When a GPS transmitter is visible to the GPS receiver 100 within the denial region 54 the formatted data message 108 does not contain the encrypted periodic key 112.

When the GPS receiver 100 is located within the denial region 54 access to the high precision navigational data 130 is denied because access to the periodic key 122 is denied.

When the GPS receiver 100 is located outside the denial region 54 at least one of the GPS transmitters is not visible within the denial region 54 but is visible to the GPS receiver 100. This GPS transmitter provides a formatted data message 108 which contains the encrypted periodic key 112. The GPS receiver 100 decodes the periodic key 122 which is used to decode the high precision navigational data 130 that is received.

The received status code, is contained in the other data 116. When the status indicates that the high precision navigational data 130 is not encrypted, then no attempt to decrypt it is made. However, it would be prudent to acquire the stored periodic key 128 if possible, in anticipation that the encrypted mode may shortly begin. When the status indicates that the stored periodic key 128 is unavailable, but one is needed, then processing of the encrypted high precision navigational data 114 has to be postponed until a GPS transmitter is found that provides the periodic key 122.

The functions that are shown in FIG. 4 can be constructed using designs that are well known.

While the block diagram shows a single channel receiver, which can access only one satellite at a time, many GPS receiver designs provide for multiple channels. A multiple channel receiver functions in a similar manner.

The receiver design for military users is slightly different. Instead of the decryption function for periodic keys, military receivers have the same key generation function as used in the GPS satellite transmitter 60. With this internal source of a periodic key, the military receivers have access to the high precision navigational data even within a denial or hostile zone 54.

It should be understood that the embodiments described herein are merely exemplary and that a person skilled in the art may make variations and modifications without departing from the spirit and scope of the invention. All such variations and modifications are intended to be included within the scope of the invention as defined in the appended claims.

What is claimed is:

1. A system for selectively retarding decryption access to encrypted high precision navigational data by selectively transmitting by satellite in a global positioning system an encryption key when access to said data is permitted and suppressing transmission of said key when decryption access to said data is to be retarded, comprising:

transmitting means operative to transmit said encrypted data and said key, means coupled to said transmitting means for selectively suppressing the transmission of said key during a desired interval while continuing to transmit said encrypted high precision navigational data, and, receiving means capable of receiving said encrypted data and said key and including means for decrypting said data strictly according to receipt of said key, wherein when said key is suppressed during said interval said receiving means cannot decrypt said data.

2. The system according to claim 1 wherein said transmitting means includes an orbiting satellite having a transmitter for transmitting encrypted navigational data to the ground and for transmitting said key, said satellite transmitter including means for suppressing transmission of said key according to the position of said satellite will respect to a designated ground area, whereby said decrypting means located within said designated ground area is retarded from decrypting said data due to said key suppression.

3. The system according to claim 2 wherein said satellite is a Global Positioning Satellite (GPS).

4. A method of selectively retarding access to encrypted high precision navigational data transmitted by the satellite transmitters employed in a global positioning system, comprising the steps of:
   providing an encryption key which is transmitted with said high precision encrypted data from said satellites,
   receiving said transmitted encrypted data and said key,
   decoding said received encrypted data solely according to said received key, and,
   suppressing the transmission of said key while transmitting said encrypted high precision data at desired times, whereby during the suppression of said key said decoding of said received encrypted data is retarded.

5. The method according to claim 4 further including the step of:
   designating certain transmission areas as hostile areas, and
   suppressing the transmission of said key when said satellite transmitter transmits to said hostile area.

6. The method according to claim 5 further comprising the step of:
   changing said key during predetermined time intervals.

7. The method according to claim 6 further comprising the step of:
   transmitting a control signal from the ground to selected satellites,
   receiving said transmitted control signal at said satellites, and, suppressing the transmission of said encryption key according to said received control signal.

8. A global positioning system including a plurality of orbiting and moving satellites each capable of transmitting to the ground, high precision navigational data which data is encrypted according to encryption format, wherein a receiver located at the ground and capable of receiving said data and decrypting said data in response to an encryption key, the combination therewith of an apparatus for selectively retarding access to said encrypted data at said ground, comprising:
   encryption means located in said satellites for defining said encryption format by means of said encryption key including means for selectively transmitting said key with said encrypted data, and,
   control means coupled to said encryption means for suppressing the transmission of said key while continuing to transmit said high precision navigational data during predetermined intervals according to a position of at least one of said satellite transmitters relative to a predetermined region, wherein said receiver located at the ground within said region is retarded from decrypting said data during the suppression of said key.

9. The GPS system according to claim 8 wherein said control means operates to suppress said key transmission for ground regions designated as hostile areas.

10. The GPS system according to claim 8 wherein said encryption means includes means for periodically changing said key according to a predetermined encryption format.

11. In a global positioning system having a plurality of orbiting and moving satellites each including a transmitter for transmitting to the ground, encrypted high precision navigational data which is encrypted according to an encryption format, defined by a transmitted encryption key, and a receiver located at the ground for receiving both the transmitted high precision data and said key, said receiver comprising:
   a memory for storing on enrollment key indicative of an authorized high precision data user, for controlling the decrypting of said data; and,
   means responsive to the receipt of said encryption key and said high precision data user, for decrypting said data according to said encryption key as controlled by said enrollment key, wherein said satellites include means for selectively suppressing the transmission of said encryption key while transmitting said encrypted high precision navigational data during predetermined intervals to retard said receiver from decrypting said data during intervals of key suppression, wherein said predetermined intervals are selected according to predetermined ground areas designated as hostile areas.

12. The GPS System receiver according to claim 11 further including means for storing the decoded encryption key in said memory.

13. A method for providing selective access to navigational data comprising the steps of:
   continuously transmitting high precision navigational data from each of a plurality of transmitters, said navigational data being encrypted in response to a periodic varying key;
   selectively transmitting said periodic key from a subset of transmitters of said plurality of transmitters only during predetermined intervals;
   receiving said encrypted data from a predetermined number of transmitters;
   receiving said periodic key from at least one of said transmitters;
   decrypting each of said received encrypted data in response to said received periodic key only during said predetermined intervals.

14. The method as recited in claim 13, further comprising the step of selecting a denial region wherein said subset of transmitters do not transmit said periodic key within said denial region.

15. The method as recited in claim 13, further comprising the steps of:
   encrypting said periodic key in response to an enrollment key before transmitting said periodic key;
   decrypting said periodic key after receiving in response to said enrollment key.

16. The method as recited in claim 13, further comprising the step of generating said periodic key in response to a master key.

17. The method as recited in claim 13, further comprising the step of selectively enabling the step of encrypting.

18. The method as recited in claim 13, wherein said periodic key changes as a function of time.

19. The method as recited in claim 13, further comprising the step of storing the received periodic key for use when the periodic key is not received from at least one of the subset of transmitters.

20. The method as recited in claim 13, wherein the step of transmitting said periodic key occurs at least twice as often as the step of selecting the periodic key.

21. A method for selectively providing high precision navigational signals adapted to enable users to determine respectively associated geographical positions, sad method comprising the steps of:

provising a plurality of transmitters;

defining a select geographical region;

selecting first and second groups from said plurality of transmitters upon said defined select geographical region;

transmitting from each of said first group of transmitters encrypted high precision navigational data, while suppressing transmission, in each of said first group of transmitters, of a cryptographic key adapted to enable decryption of said encrypted navigational data; and, transmitting from each of said second group of transmitters said encrypted navigational data and said cryptographic key.

22. A method for selectively providing signals adapted to enable users to determine respectively associated geographical positions, said method comprising the steps of:

defining a plurality of geographical regions;

continuously transmitting high precision navigational data into each of said plurality of geographic regions;

suppressing transmission of a cryptographic key adapted to enable decryption of said encrypted navigational data into at least one select geographical region selected from said plurality of geographical regions; and, transmitting said cryptographic key into each of said plurality of geographical regions which is not said at least one select geographical region.

23. The method of claim 22, further comprising the step of transmitting encrypted navigational data into each of said plurality of geographical regions.

24. A method for selectively providing signals adapted to enable users to determine respectively associated geographical positions, said method comprising the steps of:

providing a plurality of transmitters; and, providing selection means for individually operating each of said transmitters in a first mode and a second mode, wherein:

said first mode comprises the step of: transmitting from each of said plurality of transmitters navigational data intended to be received by each of a plurality of receivers and enable each of said plurality of receivers to accurately identify its respective geographical location; and, said second mode comprises the steps of:
  defining a plurality of geographical regions;
  transmitting encrypted high precision navigational data into each of said plurality of geographic regions;

suppressing transmission of a cryptographic key adapted to enable decryption of said encrypted navigational data into at least one select geographical region selected from said plurality of geographical regions; and, transmitting said cryptographic key into each of said plurality of geographical regions which is not said at least one select geographical region.

* * * * *